(12) United States Patent
Macmaster (10) Patent No.: US 7,170,680 B2
(45) Date of Patent: Jan. 30, 2007

(54) PRIVACY SCREEN FOR A DISPLAY

(75) Inventor: Steven William Macmaster, Philadelphia, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 140 days.

(21) Appl. No.: 11/030,683

(22) Filed: Jan. 6, 2005

(65) Prior Publication Data

US 2006/0146405 A1   Jul. 6, 2006

(51) Int. Cl.
G02B 5/30 (2006.01)
G02B 27/28 (2006.01)

(52) U.S. Cl. .................. 359/501; 359/497; 359/352

(58) Field of Classification Search ............ None
See application file for complete search history.

(56) References Cited

U.S. PATENT DOCUMENTS

| | | | |
|---|---|---|---|
| 5,175,638 A | 12/1992 | Kamemota et al. | |
| 5,612,801 A | 3/1997 | Winker | |
| 6,124,920 A | 9/2000 | Moseley et al. | |
| 6,239,853 B1 * | 5/2001 | Winker et al. | 349/117 |
| 6,262,843 B1 | 7/2001 | Marx | |
| 6,372,309 B1 | 4/2002 | Claussen et al. | |
| 6,462,892 B1 | 10/2002 | Kuroki | |
| 2001/0055160 A1 | 12/2001 | Hsu | |
| 2002/0158967 A1 | 10/2002 | Janick et al. | |
| 2003/0067568 A1 | 4/2003 | Hamamoto | |
| 2003/0147030 A1 | 8/2003 | So-Ne | |
| 2003/0193636 A1 * | 10/2003 | Allen et al. | 349/117 |

FOREIGN PATENT DOCUMENTS

| | | |
|---|---|---|
| EP | 1 536 269 A1 | 6/2005 |
| WO | WO 03/014780 A2 | 2/2003 |

OTHER PUBLICATIONS

Applicant's Assignee's copending U.S. Appl. No. 10/722,719, filed Nov. 26, 2003.
Applicant's Assignee's copending U.S. Appl. No. 10/926,474, filed Aug. 26, 2004.
Applicant's Assignee's copending U.S. Appl. No. 10/978,546, filed Nov. 1, 2004.
European Search Report dated Apr. 12, 2006.

* cited by examiner

Primary Examiner—Arnel C. Lavarias
Assistant Examiner—Aline D. McNaull (57) ABSTRACT

A privacy screen for a vertically polarized display (e.g., a LCD) that comprises a rotating film, a polarizing film and a birefringent film is described. The privacy screen transmits substantial amounts of light emanating from the display in an orthogonal (or near-orthogonal) direction while not transmitting substantial amounts of horizontal, non-orthogonal light emanating from the display. In this manner, a privacy effect results in that the display is viewable by someone only when that someone is essentially directly in front of the display.

17 Claims, 5 Drawing Sheets

PRIVACY SCREEN FOR A DISPLAY

BACKGROUND OF THE INVENTION

1. Field of the Invention

This invention pertains to displays, especially liquid crystal displays (LCDs) with vertically polarized output and, more particularly, to an assembly for restricting the field of view of such displays so that the image appearing on the display is visible primarily to a user sitting directly in front of the screen and is not observable to other individuals viewing the screen at an oblique angle. This objective of viewing privacy is achieved by substantially eliminating light emanating from the screen other than in a substantially perpendicular manner.

2. Description of Related Art

Liquid crystals are useful for electronic displays because polarized light traveling through the liquid crystal layer is affected by the layer's birefringence, which can be changed by the application of a voltage across the layer. As a result, the transmission or reflection of light can be controlled with much less power than is required for the luminescent materials used in other types of displays. This contributes to the longer life, lower weight and low power consumption of the LCD displays.

In LCD computer monitor and television displays a matrix of pixels is arranged across the display. These pixels are activated by an X-Y sequential addressing scheme between two sets of perpendicular conductors. Where the displays incorporate nematic liquid crystals, arrays of thin film transistors can be used to control the driving voltages at the individual pixels.

In many applications, it is desirable to broaden the angle under which the display is viewable without distortion of loss of contrast. For example, in avionics it is important that the display be clear and undistorted to several individuals viewing the screen from various angles. In many instances, it is also desirable for a computer display to be visible to observers other than the user and for video screens to present an undistorted image to an audience sitting other than directly in front of the screen. Assemblies which will allow a greater undistorted, high intensity-viewing angle are shown in numerous prior art references, such as U.S. Pat. No. 5,612,801.

However, numerous applications are arising where it is desirable to significantly narrow the usable viewing angle to provide viewing privacy. The intention is to allow access to the image on the screen only to the party sitting directly in front of the screen and to prevent a person sitting next to the user or standing over the user from seeing the image on the screen. For example, it is now becoming commonplace for computer users to use portable computers on airplane flights to work on proprietary documents. For security reasons, it is most desirable to prevent a passenger sitting in the next seat or passing down the aircraft aisle from observing the information on the screen. Secondly, newer cabin designs in aircraft are replacing larger, centrally located viewing screens, usually hanging over the aisle, with smaller individual screens which drop from the overhead compartment, or individual screens mounted in each passenger's seat back or tray table so that each passenger can select his own entertainment. Often, because each passenger may be receiving and/or paying individually for his or her chosen entertainment display, such as a movie or access to various web sites or, for security reasons, the receipt of proprietary e-mail messages, it is desirable to prevent surrounding parties from observing the contents of the display.

Most devices developed to enhance usage of LCD displays are directed to making the image thereon available to a broader audience. Devices which can be added to the LCD device to narrow the field of view and limit the scope of the viewing audience in a simple, light weight and unobtrusive manner without loss of brightness of the image are not commonly available. Currently, to reduce the angle of vision, micro-louvers provided by 3M are used. However, they result in a reduction of image brightness that must be compensated for by increasing the power applied to the backlight and/or use of various brightness enhancing films. That deficiency is addressed by the present invention which is a privacy screen for a display comprising a rotating film, a birefringent film and a polarizing film, and entails use of the privacy screen on a display having a state of polarization in order to narrow the field of view of the display, thereby achieving privacy. The privacy screen is assembled in a manner such that the horizontal components of light rays emitted from the display screen in other than a substantially orthogonal manner are blocked by the privacy screen and not transmitted to the observer. As a result, the opportunity to view the image on the screen from other than approximately 90° is significantly reduced or eliminated. The intensity of the transmitted light may be enhanced by the addition a brightness enhancement film.

U.S. Pat. No. 6,239,853 discloses a LCD privacy screen comprising staggered waveplates that contain alternating birefringent and isotropic film portions. While the privacy screen disclosed in this patent may be effective, it has drawbacks of having a complex design of alternating birefringent and isotropic regions (as stripes), which are difficult, time-consuming and relatively expensive to fabricate. More importantly, the Rockwell patent is based on full-wave and half-wave considerations only, without consideration to changes in angle of incidence upon retardation effects. The present invention fulfills a need for an efficient and cost-effective privacy screen for the display industry.

SUMMARY OF THE INVENTION

The present invention addresses the above-mentioned need in that it affords a privacy screen that is based on change in retardation as the angle of incidence (or view angle) changes for light passing through a birefringent medium.

In one embodiment, the invention is a privacy screen for a vertically polarized display comprising:

a) a rotating film for receiving vertically linearly polarized light from the display, rotating the vertically linearly polarized light to about a 45 degree linearly polarized light upon transmission of the polarized light through the rotating film;

b) a first uniaxially birefringent film for transmitting light received from the rotating film that is about a 45 degree linearly polarized light, the first birefringent film having a thickness $d_1$ and a retardation value R:

$$R = (n_e - n_o) d_1 / \cos \theta$$

$\theta$ being the angle of light incident upon the screen from the display, and $n_o$ and $n_e$ being the refractive indices, respectively, along the ordinary and extraordinary axes of the first birefringent film, wherein $d_1$ is greater than 25 micrometers so that R is responsive to changes in $\theta$; and c) a first polarizing film having a polarizing axis positioned to receive the linearly polarized light transmitted from the first birefringent film.

In another embodiment, the invention is a privacy screen as indicated above and further comprising:

d) a second birefringent film for transmitting light received from the first polarizing film that is linearly polarized to the polarizing axis of the first polarizing film, the second birefringent film having a thickness $d_2$ of greater than or equal to 25 micrometers; and e) a second polarizing film positioned to receive the linear polarized light transmitted from the second birefringent film, the second polarizing film having a polarizing axis.

In yet still another embodiment, the invention is a privacy screen for a vertically polarized display comprising:

a) a rotating film for receiving vertically linearly polarized light from the display, rotating the vertically linearly polarized light to about a 45 degree linearly polarized light upon transmission of the polarized light through the rotating film;

b) a first biaxially birefringent film for transmitting light received from the rotating film that is about a 45 degree linearly polarized light, the first birefringent film having a thickness $d_1$ and a retardation value $R_\theta$ for light incident on the film at an angle $\theta$ measured with respect to normal that is approximated by the relationship below:

$$R_\theta \sim = R_o[1+\sin^2\theta/2n_i n_{avg}];$$

wherein the first biaxially birefringent film is characterized as having unit vectors a and b that define its film plane and a unit vector c that defines its normal;

$R_o = [n_b - n_a]d_1$ and is retardation of normal incident light;

$n_{avg} = (n_a + n_b + n_c)/3$ = average index for the biaxially birefringent film; $n_i$ is selected from the group consisting of $n_a$, $n_b$, and $n_c$ to correspond to the unit vector (a, b, or c) that describes the vertical direction of the display; and $d_1$ is greater than 25 micrometers so that R is responsive to changes in $\theta$; and c) a first polarizing film having a polarizing axis positioned to receive the about a 45 degree linearly polarized light transmitted from the first birefringent film.

There are additional embodiments of the privacy screen involving additional birefringent film(s) and additional polarizing film(s).

DETAILED DESCRIPTION OF THE INVENTION

Figure 1:
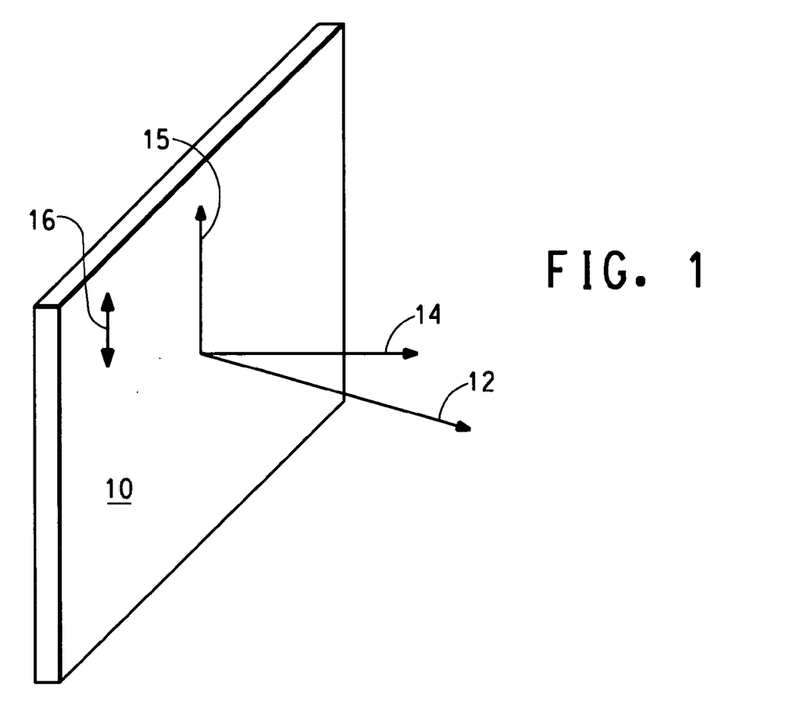
FIG. 1 is a schematic perspective representation of light emitted from a LCD screen.

FIG. 1 is a schematic representation of a LCD display screen 10 showing a ray of light 12 emanating perpendicular (orthogonal or normally incident) to the face of a LCD screen (90°) and two non-orthogonal rays of light 14 and 15, which are representative of non-orthogonal light. The first ray 14 is other than 90° in the horizontal direction only and the second ray is other than 90° in the vertical direction only. The non-orthogonal ray with horizontal components 14 provides visibility of the image on the LCD screen to other than the individual sitting directly in front of the screen. It is the purpose of this invention to prevent as much as is practical of this horizontal, non-orthogonal ray from being visualized.

Typically a LCD display screen larger than a 17-inch diagonal, such as 10, outputs polarized light rays having a polarity of vertically linearly polarized (as illustrated by double-arrowed line 16 in FIG. 1). The LCD display screen has a display polarizing axis of vertical (e.g., vertical) as indicated above. Before describing theoretical considerations and other details relating to the privacy screen of this invention, the structural features of the main embodiments of privacy screens of this invention will be outlined. As found herein, "vertical" or "vertically" shall include light that is emmitted vertical or at least nearly vertical; and "linear" or "linearly" shall include light that is emitted linear or at least substantially linear.

Figure 2A:
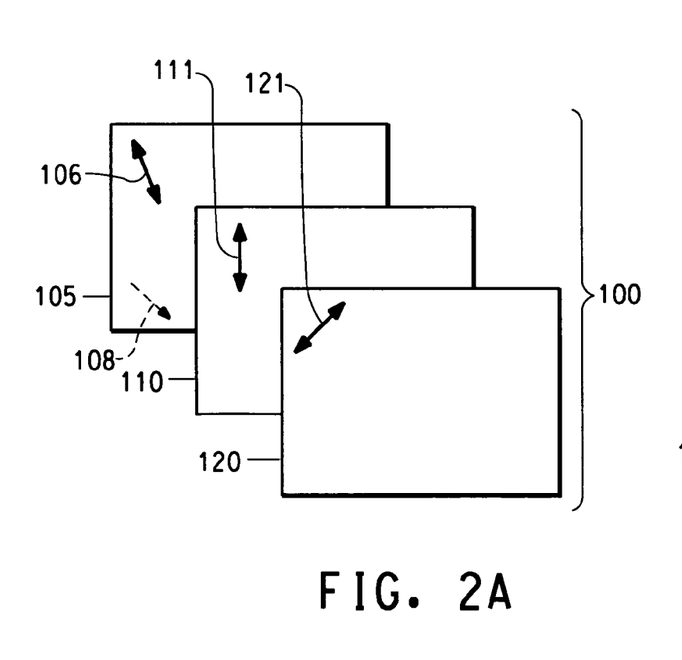
FIG. 2A is a perspective front view of a three-layer privacy screen.
Figure 2B:
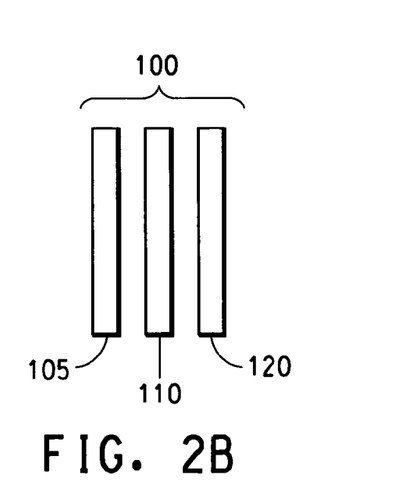
FIG. 2B is a side view of the three-layer privacy screen of FIG. 2A.

In one embodiment, the privacy screen 100 of this invention comprises a rotating film 105, a first birefringent film 110 and a first polarizing film 120 as illustrated in FIGS. 2a and 2b. The rotating film receives the vertically linearly polarized light from the display and rotates it to be about a 45 degree linearly polarized light upon transmission of the light through the rotating film. The birefringent film can possess properties such that it is uniaxally birefringent or biaxally birefringent (as defined below). Preferably, the film is uniaxally birefringent. The first polarizing film is also sometimes called an analyzer. The rotating film 105 and the first birefringent film 110 possess optical axes and the first polarizing film 120 possesses a polarizing axis. The angular relationships between the optical axis of the rotating film, the optical axis of the first birefringent film, and the polarizing axis of the first polarizing film are not limited apart from there being preferences for these angular relationships. Preferably, in this embodiment, the optical axis of the rotating film is about (negative) −22.5 degrees from vertical, the polarizing axis of the first polarizing film is about (plus) +45 degrees from vertical, and the optical axis of the first birefringent film is vertical. This preference corresponds to the relationships of the axes as shown in FIGS. 1 and 2A where the display polarizing axis is 16, the optical axis of the rotating film is 106, the optical axis of the first birefringent film is 111, and the polarizing axis of the first polarizing film is 121.

Figure 3A:
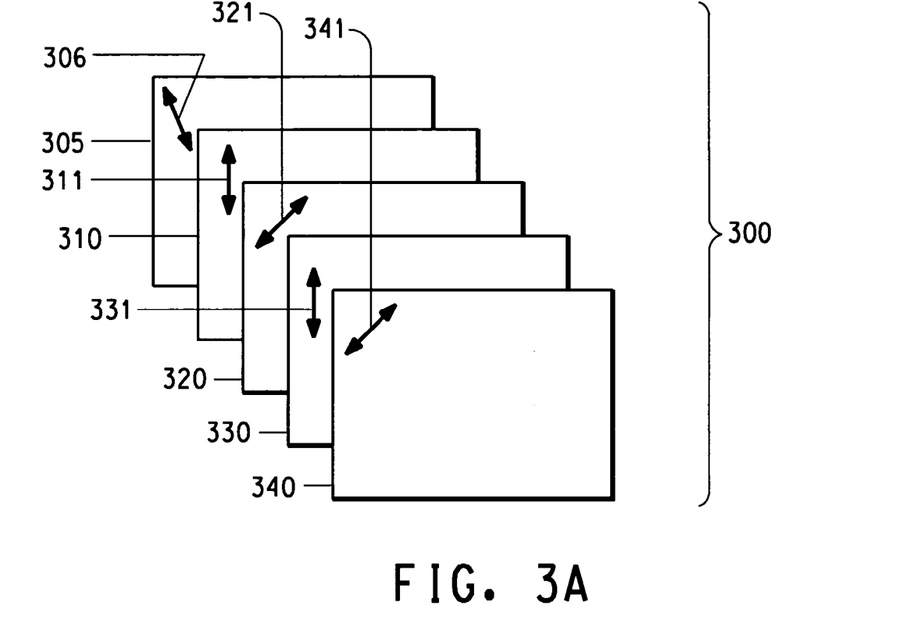
FIG. 3A is a perspective front view of a five-layer privacy screen.
Figure 3B:
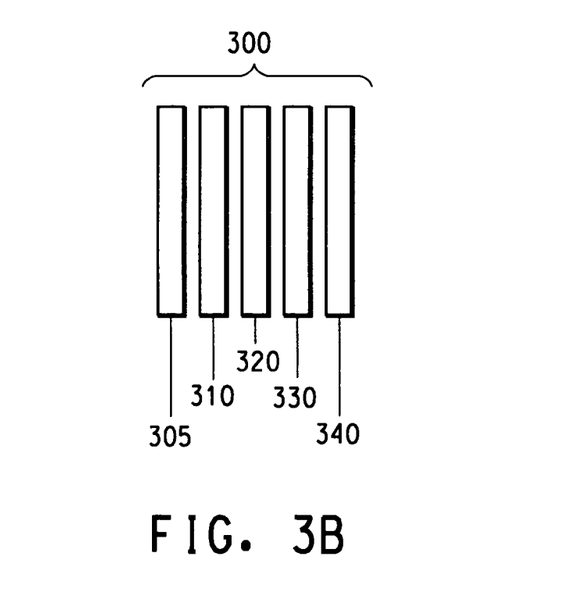
FIG. 3B is a side view of the five-layer privacy screen of FIG. 3A.

In another embodiment, the privacy screen 300 of this invention comprises a rotating film 305, a first birefringent film 310, a first polarizing film 320, a second birefringent film 330, and a second polarizing film 340, as illustrated in FIGS. 3a and 3b. The rotating film receives the vertically linearly polarized light from the display and rotates it to be about a 45 degree linearly polarized light upon transmission of the light through the rotating film. Both birefringent films can possess properties such that they are uniaxally birefringent or biaxally birefringent (as defined below). Preferably these films are uniaxally birefringent. The first polarizing film is sometimes called an analyzer. The first and second birefringent films 310, 330 and the rotating film 305 possesses optical axes, and the first and second polarizing films 320 and 340 possesses polarizing axes. The angular relationships between the display polarizing axis, the optical axis of the rotating film, the optical axes of the first and second birefringent films, and the polarizing axes of the first and second polarizing films are not limited apart from there being preferences for these angular relationships. Preferably, in this embodiment, the optical axis of the rotating film is about (negative) −22.5 degrees from vertical, the polarizing axes of the first and second polarizing films are about (plus) +45 degrees from vertical, and the optical axes of the first and second birefringent films are vertical. This preference corresponds to the relationships of the axes as shown in FIGS. 1 and 3A where the display polarizing axis is 16, the optical axis of the rotating film is 306, the optical axis of the first birefringent film is 311, the polarizing axis of the first polarizing film is 321, the optical axis of the second birefringent film is 331, and the polarizing axis of the second polarizing film is 341. Preferably, as shown in FIG. 3A, the optical axes (311, and 331, respectively) of the first and second birefringent films are parallel, the polarizing axes (321 and 341, respectively) of the first and second polarizing films are parallel and are about (plus) +45 degrees with respect to vertical, and the optical axis of the rotating film is about (minus) −22.5 degrees with respect to vertical. In other words, the angle between the optical axis of the rotating film and either of the first and second polarizing films is about 67.5 degrees in this embodiment.

Figure 4:
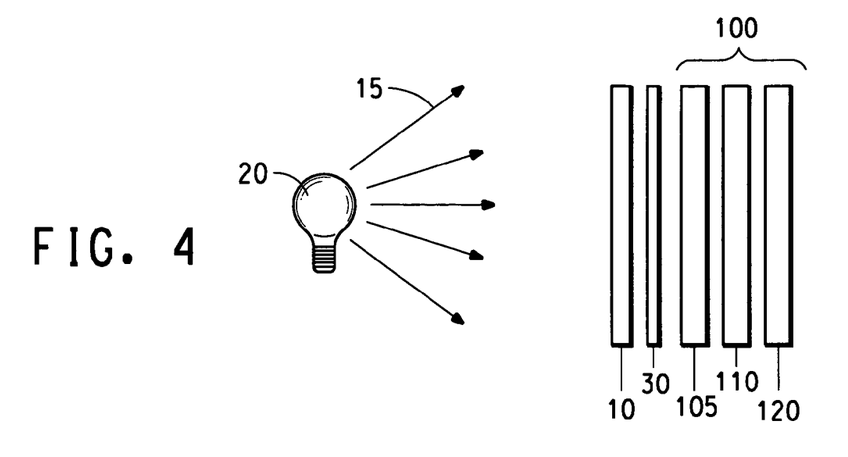
FIG. 4 is a side view of one embodiment (100) of the privacy screen of this invention in use on a typical back-lit display.

FIG. 4 illustrates use of an embodiment (100) of this invention as a privacy screen for a typical back-lit LCD arrangement. Light 15 generated by a source 20 behind the LCD screen 10, in combination with electronic activation of the LCD screen pixels, generates an image on the screen. That light permeates through the transparent portions of the screen. This light can radiate orthogonally, as well as at various different angles to the face of the LCD screen. A conventional display output polarizer 30 may optionally be used on the exit side of the LCD display 10 to create the display image and define the display's polarizing axis. A LCD display that is a complete unit having polarizers already attached to the display possesses a display polarizing axis by virtue of the polarizers; adding a display output polarizer 30 in this case is not necessary but is optional. The LCD 10 (if equipped with polarizer(s)) and/or the display output polarizer 30 serve(s) as the input polarizer for the privacy screen and will be referred to as the "input polarizer". If an LCD is not being used as the display (e.g., if a plasma display or cathode ray tube (CRT) is being used) then an input polarizer must be added in front of the non-LCD display in order for the display to have a defined polarizing axis.

A polarizer (polarizing film) transmits only those wavetrain components of light which vibrate parallel to the polarizing direction of the film and absorbs those that vibrate at a right angle to said direction. While some wavetrain components not parallel to the polarizing direction of the polarizing film may be transmitted, the light emerging (passing through) the polarizing film is linearly polarized.

A material is birefringent if it has different refractive indices in different directions. Any material may be fully characterized by 3 principle indices along orthogonal axes. If two of these indices are the same (called "ordinary", $n_o$) and the third is different (called "extraordinary", $n_e$) it is uniaxially birefringent. If $n_e > n_o$ it is positively birefringerit. If the refractive index is the same in all three directions the material is referred to as "isotropic".

In a uniaxially birefringent film structure, if the extraordinary index (or c-axis) lies in the plane of the film, it is referred to as an a-plate. This is because it approximately approaches the optical symmetry as what crystallographers refer to as an a-cut crystal. Such an a-plate is said to be half-wave if its thickness, d, and birefringence $n_e - n_o$ are chosen such that:

$$(n_e - n_o)d = \lambda/2$$

where $\lambda$ is the wavelength of incident light. Half-waveplates have the property that when plane polarized light is incident on them such that the polarization vector makes an angle theta ($\theta$) with the extraordinary axis of the film, the plane of polarization is rotated by twice theta as the light passes through. It is noted that a true uniaxial material can only be found in single crystals in the solid state. Polymeric films, as found herein, are identified as uniaxially birefringent when delta $n_{ac}$ or delta $n_{bc}$ is large when compared to delta $n_{ab}$ whereby $n_a$ and $n_b$ are approximately equal, both are referred to as $n_o$, the ordinary index and $n_c$ being different (larger or smaller) is referred to as $n_e$ the extraordinary index; wherein a, b, and c are unit vectors defining the molecular or polymeric optical anisotropy space. In the case of an a-plate like film, b and c define the film plane with the ordinary index, $n_o$, being along the b axis and the extraordinary index, $n_e$, being along the c axis.

A biaxially birefringent film is defined to be one in which all three principal indices of refraction have different values, i.e., $n_a \neq n_b \neq n_c$ and $n_a \neq n_c$, where a, b, and c are unit vectors with a and b defining a film plane and c is normal to this film plane. For a biaxially birefringent film of thickness d with light incident normally the retardation is given the equation:

$$R_o = [n_b - n_a]d$$

A biaxial film possesses two optical axes which, in the case $n_a < n_b < n_c$, are in the ac plane with the angle $\alpha$ on either side of c given by the equation:

$$\tan \alpha = n_c/n_a ((n_b^2 - n_a^2)/(n_c^2 - n_b^2))^{1/2}$$

For a biaxially birefringent film, the retardation value is approximated by the relationship below as shown below if delta n is small ($<= \sim 0.01$):

$$R_\theta \sim = R_o[1 + \sin^2 \theta / 2n_i n_{avg}]$$

where $n_{avg}$ is the average index (average of $n_a$, $n_b$, and $n_c$) and $n_i$ is selected from the group consisting of $n_a$, $n_b$, and $n_c$ to correspond to the unit vector (a, b, or c) that describes the vertical direction of the display. As one example, for the specific case of retardation of a biaxial film with $\theta$ in the bc plane (horizontal if a is vertical), the retardation value is approximately as shown below:

$$R_\theta \sim = R_o[1 + \sin^2 \theta / 2n_a n_{avg}]$$

It is important to emphasize that the above approximation is true only if projection of one of the optical axes of the biaxial film onto a film plane of the biaxial film is 90° to a plane of incidence containing $\theta$ for light that is incident upon the film. If the ordering of $n_i$ is different than that shown above, then one must appropriately modify the above equations or approximations. In general, retardation values for other cases involving biaxially birefringent films are vastly more complex and can only be described by complex matrix representations.

As explained supra, FIG. 4 illustrates one embodiment of the privacy screen 100 of this invention comprising a rotating film 105, a first birefringent film 110 and a first polarizing film (analyzer) 120 being used on a display screen 10 that is equipped with an input polarizer 30. Components of light upon exiting the input polarizer 30 and passing through the rotating film and the first birefringent film will have their polarization axis rotated appreciably and to an extent that is proportional to distance that the light traverses in passing through the birefringent film. For orthogonal light, the distance traversed in passing through the birefringent film is minimal and equal to the thickness d of the film. For non-orthogonal (oblique) light, the distance is greater than the thickness d of the film and depends upon the angle measured with respect to normal that the light is incident upon the film. In the present invention, the degree of birefringence (e.g., $n_e-n_o$ for a uniaxial birefringent film) and the thickness d of the birefringent film are chosen appropriately in relation to the optical and polarizing axes of the display and privacy screen such that substantially all orthogonal light is transmitted through the privacy screen, exits film 120 and hence is viewable by an observer while non-orthogonal light in the horizontal direction is substantially blocked by the privacy screen, does not exit film 120, and hence is not viewable by an observer.

In an embodiment of the privacy screen 100 in use on a display screen 10 having a display polarizing axis 16 as shown in FIG. 1, the polarizing axis 121 of the first polarizing film 120 will be crossed (at 90°) to the polarizing axis 108 of light exiting the rotating film as shown in FIG. 2A. The degree of birefringence and thickness of the first birefringent film have been chosen such that an orthogonal light ray will have its polarization vector rotated by approximately 90° upon passing through the birefringent film 110. Thus, orthogonal light upon exiting the birefringent film will have its polarization vector parallel or at least substantially parallel to the polarizing axis of the first polarizing film and will be transmitted such that it can be seen by an observer. In contrast, non-orthogonal light rays will have their polarization vectors rotated to angles that are greater than 90° with the amount of rotation being greater for rays that are incident upon the birefringent film at more oblique angles. Consequently, a substantial amount of oblique light rays will not have their polarization vectors parallel to the polarizing axis of the first polarizing film, will not be transmitted through the privacy screen, and hence will not be observable by an observer. In brief for this embodiment, the first birefringent film and the first polarizing film, which together with the rotating film comprise the privacy screen, work in combination to prevent light traversing the birefringent film in an oblique horizontal manner and transmitted through the LCD and/or the input polarizer 30 from reaching an observer. In sharp contrast, normally incident light is not blocked by the privacy screen and is viewable to an observer viewing at or near the normal direction.

More specifically, the enhancement described above is needed because retardation at a normal incident view zone for the first embodiment is $\lambda/2$ which passes through the first polarizing film. The retardation changes to $\lambda$ at more oblique angles, e.g. perhaps 30° where the privacy effect is still present. Since this retardation behaves as a function of cosine of $\theta$, as $\theta$ changes through this plane, at some angle the retardation will shift towards $3\lambda/2$ and, thus, also pass through the first polarizing film. This embodiment has a second birefringent film whose retardation characteristics are zero or $\lambda$ (the same thing) at the normal zone such that normal or near normal light can pass through the second polarizing film. Furthermore, the second birefringent film has a retardation of $\lambda/2$ at the angle which coincides with the $3\lambda/2$ of the first birefringent film such that non-normal light will now be blocked by the second polarizing film when it is parallel to the first polarizing film.

Figure 5:
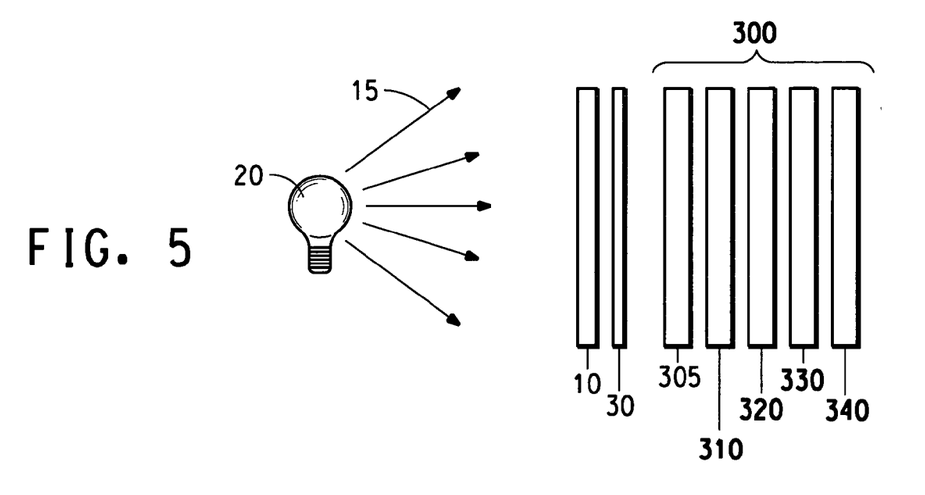
FIG. 5 is a side view of yet another embodiment (300) of the privacy screen of this invention in use on a typical back-lit display.

FIG. 5 illustrates use of another embodiment (300) of this invention as a privacy screen for a typical back-lit LCD arrangement. The function and operation of the back-lit LCD arrangement is the same as described above. In this embodiment, the privacy screen 300 comprises five layers as described above. The purposes and functions of the first and second birefringent films and first and second polarizing films are the same as described above for privacy screen 100. Some additional specifications for the rotating films, birefringent films and polarizing films in this invention are presented next.

The rotating films described herein are half-wave retarders sometimes referred to as polarization rotators since they rotate linear polarization by an angle of $2\theta$ where $\theta$ is the angle between the linear polarization axis and the fast axis (optical axis of a uniaxial material). This is similar as retarding the slow axis vector's phase by $\pi$ (phase retardation). More simply, the rotating film takes the vertically linearly polarized light from the display and rotates the light upon transmission of the polarized light through the rotating film making it orthogonal to the first polarizing film.

All vectors can be considered the sum of other vectors. It is considered that linear polarized light is the sum of two orthogonal vectors. Therefore, a half-wave plate film when placed into a light's path can break the light into two orthogonal electric field vectors, one parallel to the optical axis of the wave plate, and one perpendicular. The wave plate rotates the perpendicular vector around the optical axis. The resultant vectors exiting the plate are linear polarized light that has been rotated by $2\theta$.

The birefringent films can be either uniaxially birefringent or biaxially birefringent. The first birefringent film has a thickness $d_1$, wherein $d_1$ is greater than 25 micrometers so that R (retardation value) is responsive to changes in $\theta$ (as was discussed above). Preferably, the first birefringent film has a thickness $d_1$ that is greater than 100 micrometers. The second birefringent film has a thickness $d_2$ of greater than or equal to 25 micrometers. Preferably, the birefringent films have thicknesses ranging from about 25 microns to about 1000 microns including all thicknesses found therein. If the film thickness is appreciably below about 25 microns, the retardation value becomes too low for birefringent films having suitable differences in refractive indices. If the film thickness is appreciably above about 1000 microns, overall thickness of the privacy screen may be too thick and cumbersome in many applications. Furthermore, the birefringent films have differences in refractive indices between two of the film axes that range from about 0.00002 to about 0.001. If the difference in refractive indices is less than about 0.00002, the retardation value will be too low and the extent of the privacy effect will be too small or negligible. If the differences in refractive indices are greater than about 0.001, the birefringent films will impart undesirable chromatic effects to the light passing through them. For the specific case of uniaxially birefringent films, $\Delta n=n_e-n_o$ ranges from about 0.00002 to about 0.001. The first and second birefringent films are chosen in this invention such that they exhibit birefringence in the visible and infrared regions of the electromagnetic spectrum. Preferably, the birefringent films are polymeric and include, but are not limited to, films of cellulose acetate (e.g., cellulose diacetate (CDA)), polyvinyl alcohol, polycarbonate, and combinations and mixtures thereof.

The invention described herein does not require any particular method for obtaining a birefringent film, there being several techniques for producing them as shown in the published literature. One technique that is commonly employed is to uniaxially stretch certain plastic films, such as polycarbonate, polyvinyl alcohol, and cellulose acetate polymeric films. An alternative is to solvent cast a solution of a polymerizable liquid crystal monomer onto a rubbed polyimide film. The c-axis of the liquid crystal film that is formed will align with the rub direction of the polyimide film. The film is dried and polymerized leaving a birefringent polymer coating on the polyimide film. Other methods of forming such birefringent films are known to those skilled in the art.

In some instances in practicing this invention, it is desirable to slightly alter the birefringence (e.g., the in-plane birefringence ($\Delta n_{xy}$) of the birefringent film(s) in order to obtain a privacy screen having a smaller privacy angle than would otherwise be present without this alteration. Suitable methods for altering the birefringence of the birefringent film(s) include, but are not limited to, heat treatment at a suitable temperature above ambient temperature for a suitable time period. In one embodiment, heat treatment of a polymeric film is done at or near the glass transition temperature ($T_g$) of the polymeric film. As one specific example, heat treatment of cast CDA (cellulose diacetate) film is done at or near the glass transition temperature (115° C.) of the cast CDA film. Other methods known to those skilled in the art can be employed without limitation to effect this alteration of birefringence of the birefringent film(s).

The magnitude of change in the birefringence of the birefringent film(s) that is desired is typically quite small. A more sensitive indication that significant changes in birefringent-related properties upon treatment for alteration of birefringence (e.g., heat treatment) is given by the in-plane retardation, $R=\Delta n_{xy}*d$, where $\Delta n_{xy}$ is the in-plane birefringence and d is the film thickness.

The polarizing films in this invention are not limited except for the requirement that they act to alter and analyze the state of polarization of light. Specifically, the polarizing films act to analyze the state of polarization either to block or to pass depending on the state that was altered by the birefringent film. Of course, passing can imply altering since, if the state is elliptical polarization, the polarizer will allow only some of the elliptically polarized light to pass as linear, that which is aligned or parallel on the axis upon passage of the light through one of these films. When polarized light from a display interacts with the birefringent films in this invention, its state of polarization is altered and, most importantly, its state is altered differently as to angle of the light incident upon it with respect to normal. The polarizers act to either pass or block light rays having these states of polarization according to their angles with respect to normal. Specifically, in this invention, the polarizers in combination with the birefringent films act to pass light within the view zone through the polarizers while blocking light within the privacy zone. Any of many different commercially available polarizers can be employed in this invention as the polarizing films. The polarizing films possess polarizing axes, such that upon passage of light through these films, the state of polarization of the light is analyzed as described supra. Again, it is the birefringent film that does the altering and the polarizers analyze the state by either passing or blocking said state.

There are preferences in this invention with regard to orientation of the polarizing axes of the polarizing films as well as the optical axes of the birefringent films with respect to the display's polarizing axis for a display bearing a privacy screen according to the invention. In one embodiment, the polarizing axis of the first polarizing film is oriented at a first angle of 90° plus or minus 60° to the display polarizing axis and the polarizing axis of the second polarizing film is oriented at a second angle of 90° plus or minus 60° to the display polarizing axis. In another embodiment, the polarizing axis of the first polarizing film is oriented at a first angle of 90° plus or minus 15° to the display polarizing axis, the polarizing axis of the second polarizing film is oriented at a second angle of 90° plus or minus 15° to the display polarizing axis, the optical axis of the first uniaxially birefringent film approximately bisects the first angle, and the optical axis of the second birefringent film approximately bisects the second angle. In still another embodiment, the polarizing axis of the first polarizing film is orthogonal to the display's polarizing axis, and, in addition, in another embodiment, the polarizing axis of the second polarizing film is orthogonal to the display's polarizing axis.

Figure 6:
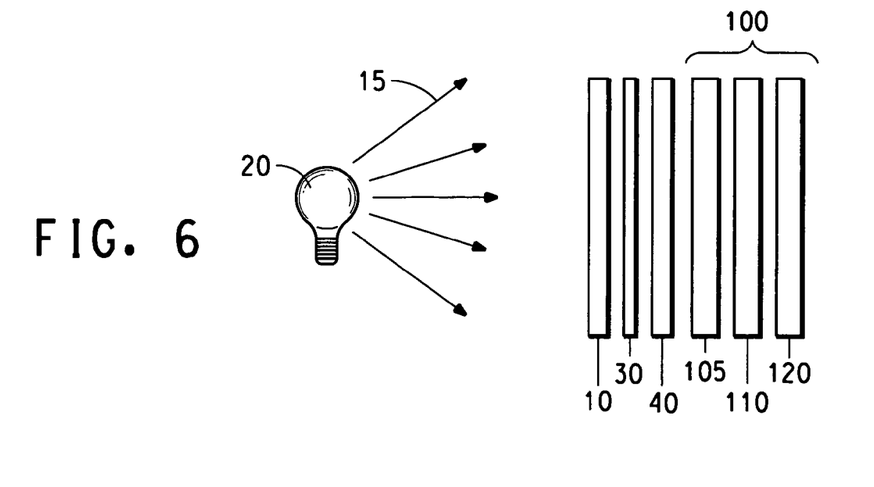
FIG. 6 is a side view of one embodiment (100) of the privacy screen of this invention together with use of a brightness enhancing film.

As a further embodiment of the above-described device, a brightness enhancing film 40 can be added at various locations, such as shown in FIG. 6, beyond the LCD screen 10 and input polarizer 30. (It can also be added in other locations, such as between the LCD screen 10 and the input polarizer 30.) A brightness enhancing film utilizes refractive optics to concentrate light in a more forward direction so that less light is transmitted in the oblique direction. These films are commercially available. The brightness enhancing film 40 focuses the light emanating from the LCD screen 10/input polarizer 30 so that more of the light reaches the back surface of the privacy screen 100 making the viewed image brighter through its normal view zone and, as a result, the light reaching the observer is more intense. When a brightness enhancing film is used less light is available at angles further from orthogonal. The use of privacy screen 100 together with a brightness enhancing film 40 that are mounted to a display screen 10/input polarizer 30 is illustrated in FIG. 6.

In cases where the privacy screen of the invention comprises a first uniaxially birefringent film and a first polarizing film, the privacy screen will exhibit a privacy effect when mounted on a display having a polarizing axis and emitting light of a wavelength λ when 1) the polarizing axis of the first polarizing film is oriented perpendicular to the display polarizing axis, and 2) when the following half-wave equation is satisfied:

$$(n_e-n_o)d_1=(2n-1)\lambda/2$$

where λ is a wavelength of light incident upon the screen from the display, $(n_e-n_o)d_1$ is the retardation value R of the first birefringent film for light incident upon the screen normal to the display, and n is an integer. In one embodiment, n=1 and the retardation value R of the first birefringent film ranges from about 50 nm to about 350 nm. In another embodiment, the retardation value R ranges from about 150 nm to about 300 nm. In still another embodiment, from about 250 nm to about 270 nm. In these embodiments satisfying the above half-wave equation, the polarizing axis of the first polarizing film is oriented perpendicular to the display's polarizing axis.

In cases where the privacy screen of the invention further comprises a second birefringent film and a second polarizing film, the privacy screen will exhibit a more extensive privacy effect (compared to the aforementioned two layer privacy screen) when mounted on a display emitting light of a wavelength λ when the following equation is satisfied:

$$(n_e-n_o)d_2=(2n-1)\lambda/2$$

where λ is a wavelength of light incident upon the screen from the display, $(n_e-n_o)d_2$ relates to the second birefringent film having a retardation value $R_2$ and is the retardation value $R_2$ of the second birefringent film for light incident upon the screen normal to the display, and n is an integer. In one embodiment, n=1 and the retardation value R of the second birefringent film ranges from about 10 nm to about 250 nm. In other embodiments, the retardation value R ranges from about 40 nm to about 100 nm, and in still other embodiments from about 60 nm to about 80 nm.

Additionally in cases where the privacy screen of the invention comprises a first uniaxially birefringent film and a first polarizing film, the privacy screen will exhibit a privacy effect when mounted on a display having a polarizing axis and emitting light of a wavelength λ when 1) the polarizing axis of the first polarizing film is oriented parallel to the display polarizing axis, and 2) when the following full-wave equation is satisfied:

$$(n_e-n_o)d_1=n\lambda$$

where λ is a wavelength of light incident upon the screen from the display, $(n_e-n_o)d_1$ is the retardation value R of the first birefringent film for light incident upon the screen normal to the display, and n is an integer. In one embodiment, n=1 and the retardation value R of the first birefringent film ranges from about 50 nm to about 350 nm. In other embodiments, the retardation value R ranges from about 150 nm to about 300 nm, and from about 250 nm to about 270 nm. In these embodiments satisfying the above full-wave equation, the polarizing axis of the first polarizing film is oriented parallel to the display's polarizing axis.

In cases where the privacy screen of the invention further comprises a second birefringent film and a second polarizing film, the privacy screen will exhibit a more extensive privacy effect (compared to the aforementioned two layer privacy screen) when mounted on a display emitting light of a wavelength λ when the following equation is satisfied:

$$(n_e-n_o)d_2=n\lambda$$

where λ is a wavelength of light incident upon the screen from the display, $(n_e-n_o)d_2$ relates to the second birefringent film having a retardation value $R_2$ and is the retardation value $R_2$ of the second birefringent film for light incident upon the screen normal to the display, and n is an integer. In one embodiment, n=1 and the retardation value R of the second birefringent film ranges from about 10 nm to about 250 nm. In other embodiments, the retardation value R ranges from about 40 nm to about 100 nm, and from about 60 nm to about 80 nm.

In cases where the privacy screen of the invention comprises a first biaxially birefringent film and a first polarizing film, the privacy screen will exhibit a privacy effect when mounted on a display having a polarizing axis and emitting light of a wavelength A when 1) the polarizing axis of the first polarizing film is oriented perpendicular to the display polarizing axis, and 2) when the following half-wave equation is satisfied:

$$\Delta n_{xy}d=(2n-1)\lambda/2$$

where λ is a wavelength of light incident upon the screen from the display, n is an integer, d is the film thickness of the first biaxially birefringent film, and $\Delta n_{xy}$ is as defined previously.

While the invention has been shown and described with reference to different embodiments thereof, it will be appreciated by those having skill in the art that variations in form, detail, compositions, and operating conditions may be made without departing from the spirit and scope of the invention as defined by the accompanying claims.

EXAMPLES

The advantages of this invention can be observed by reference to the following examples, which illustrate, but do not limit, the invention. In these examples material or film thicknesses are mil (1/1000ths of an inch), angles are in degrees of arc, and transmission and transmittance are in percent of incident unless otherwise indicated.

Glossary

CDA—Cellulose diacetate; film thicknesses sampled between 7 mil and 30 mil; Clarifoil, An ACORDIS group member, United Kingdom Cellophane An extruded cellulose (viscose), product name Clearphane supplied by Highland Supply Corporation, 111 Sixth Street, Highland, Ill. 62249-1408

C.I.E.—Commission Internationale de l'Eclairage or International Commission on Illumination LCD—Liquid Crystal Display; ViewSonic VA720: ViewSonic, Walnut, Calif.

LP—Linear Polarizer; Tech Spec Linear Polarizing Laminated Film; Edmund Scientific, Barrington, N.J.

PA Privacy angle, which is the angle measured between viewing directions on either side of normal of a display where the light output has dropped to 5% of the light output at normal (without any physical obstruction of light output measured at normal). As one example, if the light output is measured to be 5% at an angle θ/2° on either side of normal (corresponding to 0°), then the privacy angle is 2×θ/2=θ°. For a display equipped with a privacy screen having a privacy angle of θ, the display is generally viewable at viewing angles within the privacy angle of θ and is not generally viewable (e.g., too dark or insufficient resolution of characters) at oblique viewing angles greater than the privacy angle of θ.

PSA—Pressure Sensitive Adhesive; AD-20; Polatechno Company Limited, Hong Kong

RGB—This term designates, respectively, the colors Red/Green/Blue at the nominal wavelengths of 632 nm for red, 550 nm for blue, and 470 nm for blue.

Rotating Film A film (e.g. extruded cellulose) that affords rotation of the plane of polarization of light (e.g., vertically polarized light) upon transmission of the polarized light through the rotating film to a different plane of polarization (e.g., such that the plane of polarization of light exiting the rotating film is orthogonal to the plane of polarization of the first polarizing film)

$T_{miss}$—Transmission, which is the amount ($I_{transmitted}$) of radiation (without regard to wavelength) that passes through a material relative to the amount ($I_{incident}$) that is incident as a percent; $T_{mis} = I_{transmitted}/I_{incident} \times 100$ $T_{mitt}$—Transmittance, which is the ratio of the amount ($I(\lambda)_{transmitted}$) of radiation of a particular wavelength $\lambda$ that passes through a material to the amount ($I(\lambda)_{incident}$) incident at that wavelength as a percent: $T_{mitt} = I(\lambda)_{transmitted}/I(\lambda)_{incident} \times 100$ VLT—Visible Light Transmission; Transmission using a white light source described as a C.I.E. equal energy source $\lambda$(lambda) Wavelength of electromagnetic radiation (light) in nanometers ($10^{-9}$ meters)

Example 1

In this example, a privacy screen having a three-layer structure was prepared and tested to demonstrate the privacy effect for liquid crystal displays with vertically polarized output. More specifically, the three-layer structure consisted of two different birefringent materials, cellophane and CDA, together with a linear polarizer. The rotating film (cellophane) was commercial film having a thickness of 1 mil. The CDA film thickness was 20 mils and was supplied by Clarifoil, an ACCORDIS group member, United Kingdom. The LP was a Tech Spec Linear Polarizing Laminated Film. These films were laminated together (with the CDA being the middle of the three films) using a PSA with an open window aperture of 4.5"×3". The optical axis of the rotating film, which coincided with the machine direction of the extruded web, was orientated at 22.5 degrees to the vertical (along the y axis with z being orthogonal to the xy plane of the display and x being the horizontal direction) with respect to the display axis. The optical axis of the CDA, which coincided with the machine direction of the cast CDA web, was orientated vertically (the vertical being the y axis with z being orthogonal to the xy plane of the display and x being the horizontal direction) with respect to the display axis, and the LP was aligned with the polarizing axis oriented 45 degrees to the optical axis of the CDA as well as 67.5 degrees with respect to the optical axis of the cellophane such that the 45 degree axis of the LP was on the opposite side of the vertical axis of the display with respect to the axis of the cellophane. The edges of the sample were then tapped over with masking tape for personnel safety reasons.

The example was attached by clamping to the front of a full color LCD mounted on a Newport rotation stage. A Photo Research Spectra Pritchard Photometer spectro-radiometer/photometer (Photo Research Inc., Chatsworth, Calif.) was mounted 24" from the normal face of the LCD. The LCD output was switchable between C.I.E. white equal energy point and saturated red, green, and blue (RGB) screens. Transmission and transmittance measurements were then taken through rotations of 80 degrees in 5 degree increments in the horizontal plane on either side of normal to the display. The results were observed to be symmetrical on either side of normal. The results that were obtained are displayed in Table 1 as percent of incident light.

TABLE 1

| Angle (°) | Transmission White | Red | Transmittance Green | Blue |
|---|---|---|---|---|
| −80 | 0 | 1 | 0 | 1 |
| −75 | 0 | 0 | 0 | 1 |
| −70 | 0 | 1 | 0 | 1 |
| −65 | 0 | 1 | 1 | 2 |
| −60 | 1 | 1 | 1 | 1 |
| −55 | 1 | 2 | 2 | 2 |
| −50 | 4 | 6 | 4 | 4 |
| −45 | 5 | 8 | 5 | 5 |
| −40 | 6 | 8 | 5 | 6 |
| −35 | 4 | 6 | 3 | 3 |
| −30 | 4 | 5 | 3 | 4 |
| −25 | 7 | 7 | 6 | 8 |
| −20 | 13 | 11 | 13 | 15 |
| −15 | 20 | 17 | 21 | 23 |
| −10 | 27 | 23 | 28 | 32 |
| −5 | 32 | 26 | 32 | 37 |
| 0 | 33 | 28 | 33 | 38 |
| 5 | 31 | 26 | 31 | 36 |
| 10 | 26 | 22 | 27 | 31 |
| 15 | 20 | 16 | 20 | 24 |
| 20 | 12 | 11 | 13 | 16 |
| 25 | 6 | 5 | 6 | 8 |
| 30 | 2 | 3 | 3 | 4 |
| 35 | 3 | 5 | 3 | 3 |
| 40 | 5 | 7 | 5 | 5 |
| 45 | 6 | 9 | 6 | 5 |
| 50 | 4 | 7 | 4 | 4 |
| 55 | 2 | 4 | 2 | 3 |
| 60 | 0 | 1 | 1 | 2 |
| 65 | 0 | 1 | 0 | 1 |
| 70 | 0 | 0 | 0 | 1 |
| 75 | 0 | 0 | 0 | 1 |
| 80 | 0 | 1 | 0 | 1 |

Figure 7:
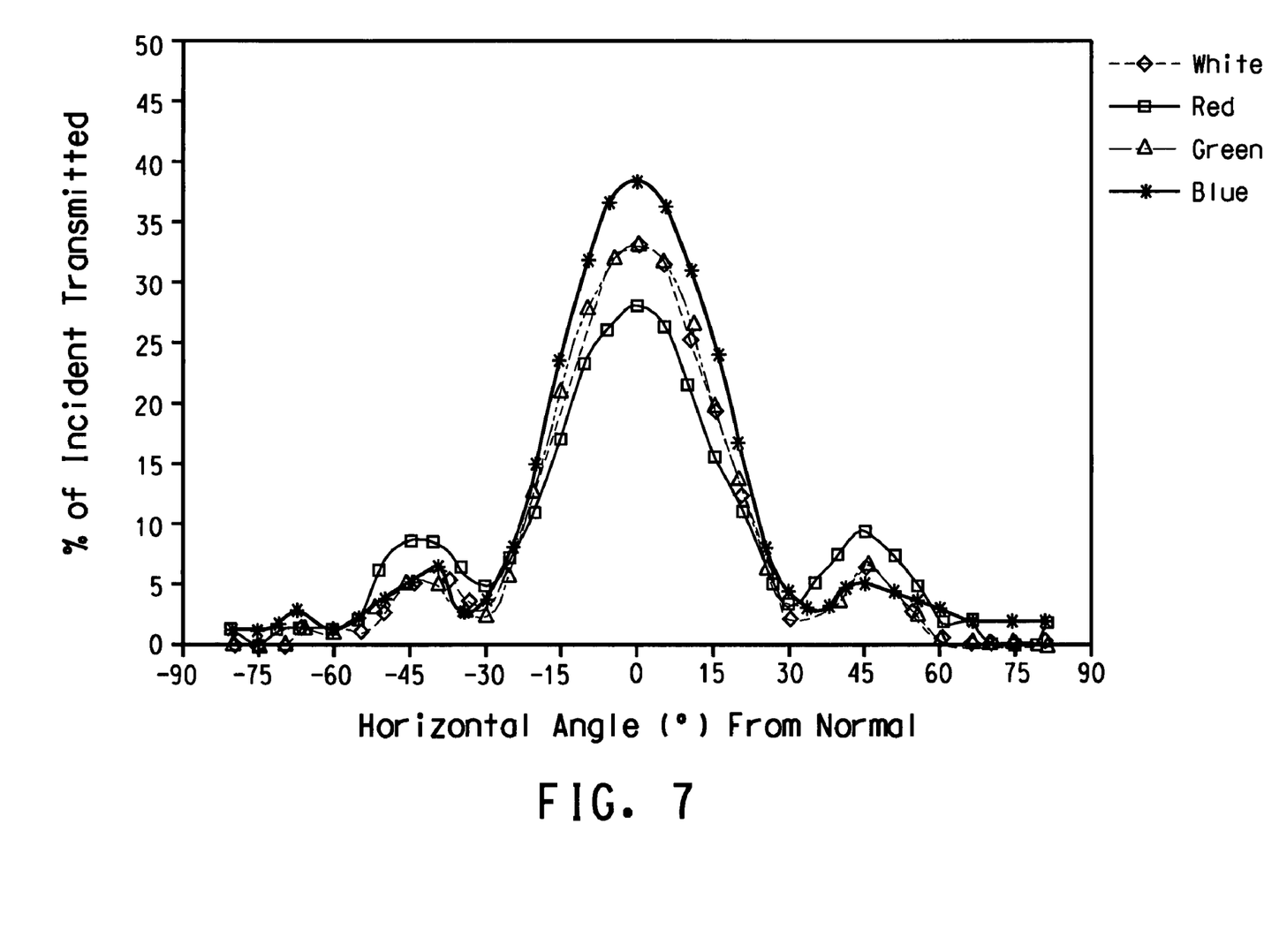
FIG. 7 is a graph of the percent of incident light transmitted versus angle with respect to normal for the privacy screen of Example 1.

The above results in Table 1 indicate that the transmission drops to a value of 5% of the unobstructed normal value of 100% (i.e., the display output at normal without any privacy screen attached or other obstruction) at an angle between 25° and 30° on either side of normal for the major viewing zone of 0° to about 30° in which the transmission is at or above 5. Hence the measured privacy angle (measured with respect to transmission) for the privacy screen of this example is between 50° and 60° for this major viewing zone. FIG. 7 shows the data of Table 1 plotted graphically. Numerical analysis of this graph for the privacy angle of this graph for while light transmission afforded a measured privacy angle of approximately 54°. In this 3-layer privacy screen, there is seen from the data in Table 1 to be a second angular range beyond 30° where the transmission is also at or above 5%. This can be considered to be a minor viewing zone that is eliminated or substantially eliminated with the additional added layers as described in the example below.

Example 2

In this example, a privacy screen having a five-layer structure was prepared and tested to demonstrate a higher level of the privacy effect resulting from the use of this structure, which contains two CDA layers and two LP layers. More specifically, in this example, the five-layer structure consisted of a cellophane layer with two layers of CDA separated by a LP with another LP film on the opposite end of the stack. The entire example was laminated together into a single stack using a PSA between each of the 5 layers.

The stack was constructed with a 1 mil rotating film (cellophane) first layer with its optical axis 22.5° from the vertical, followed by a 20 mil CDA with its optical axis vertical, followed by a LP with its axis 45° from vertical and 67.5° from the optical axis of the cellophane first layer, followed by a 10 mil CDA with optical axis vertical, followed by a second LP whose axis was parallel to the first LP. In general, the optical axis of the cellophane was 22.5° from the vertical. The two CDA layers were parallel and had optical axes in the vertical. The two LP layers were parallel with axes tilted 45° with respect to the axes of the CDA and 67.5° with respect to the optical axis of the cellophane. (Note: vertical alignment of the CDA optical axes provides an axis of symmetry for privacy performance in the horizontal plane).

In a similar manner as given in the preceding example, the five-layer privacy screen was then mounted to a measuring LCD and measured as previously described with results given in Table 2.

TABLE 2

| Angle (?) | Transmission White | Transmittance Red | Green | Blue |
|---|---|---|---|---|
| −80 | 1 | 0 | 0 | 0 |
| −75 | 1 | 1 | 0 | 0 |
| −70 | 1 | 1 | 0 | 0 |
| −65 | 2 | 1 | 0 | 0 |
| −60 | 2 | 1 | 0 | 1 |
| −55 | 2 | 2 | 1 | 2 |
| −50 | 2 | 4 | 2 | 2 |
| −45 | 4 | 5 | 3 | 3 |
| −40 | 4 | 7 | 4 | 4 |
| −35 | 4 | 7 | 4 | 4 |
| −30 | 5 | 7 | 4 | 4 |
| −25 | 8 | 9 | 8 | 8 |
| −20 | 16 | 14 | 15 | 17 |
| −15 | 25 | 21 | 24 | 26 |
| −10 | 33 | 28 | 33 | 35 |
| −5 | 38 | 33 | 38 | 41 |
| 0 | 41 | 36 | 41 | 45 |
| 5 | 39 | 34 | 40 | 44 |
| 10 | 36 | 31 | 37 | 39 |
| 15 | 29 | 25 | 30 | 33 |
| 20 | 20 | 18 | 21 | 24 |
| 25 | 11 | 10 | 12 | 14 |
| 30 | 4 | 5 | 4 | 6 |
| 35 | 2 | 3 | 2 | 3 |
| 40 | 3 | 5 | 3 | 3 |
| 45 | 4 | 7 | 5 | 4 |
| 50 | 4 | 7 | 4 | 4 |
| 55 | 2 | 4 | 2 | 3 |
| 60 | 2 | 1 | 1 | 2 |
| 65 | 1 | 1 | 0 | 1 |
| 70 | 1 | 1 | 0 | 0 |
| 75 | 1 | 1 | 0 | 0 |
| 80 | 1 | 1 | 0 | 0 |

Figure 8:
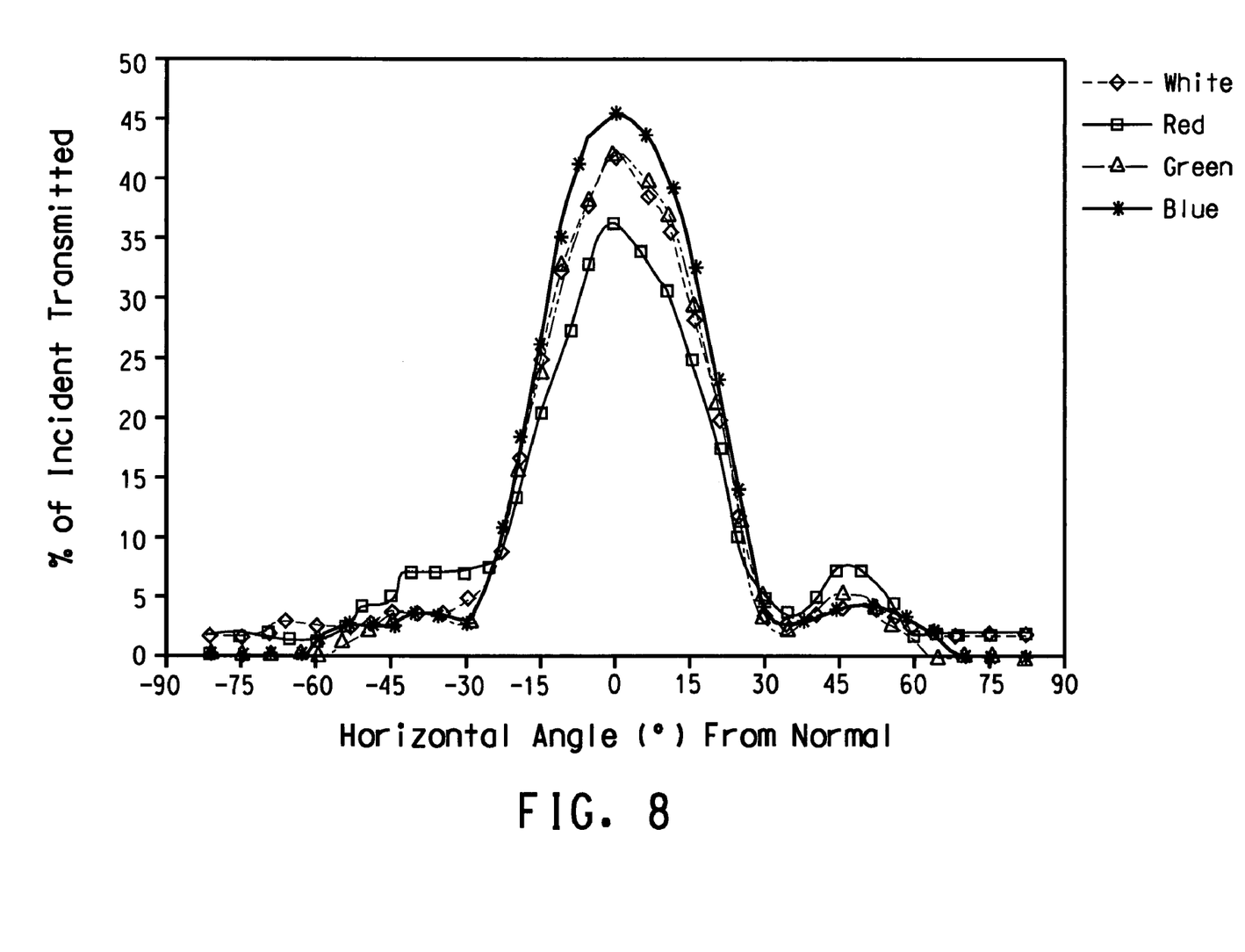
FIG. 8 is a graph of the percent of incident light transmitted versus angle with respect to normal for the privacy screen of Example 2.

The results in Table 2 indicate that the transmission drops to a value of 5% of the unobstructed normal value of 100% (i.e., the display output at normal without any privacy screen attached or other obstruction) at an angle of 30° on one side of normal and between 25° and 30° on the other side of normal for the major viewing zone of 0° to about 30° in which the transmission is at or above 5. Hence, the measured privacy angle (measured with respect to transmission) for the privacy screen of this example is between 55° and 60° for the major viewing zone. FIG. 8 shows the data of Table 2 plotted graphically. The data in Table 2 indicate there is not a second angular range beyond 30° where the transmission is also at or above 5%. Thus, there is not a minor viewing zone in this example having the additional layers.

What is claimed is:

1. A privacy screen for a display comprising:
a) a rotating film for receiving vertically linearly polarized light from the display, rotating the light to about a 45 degree linearly polarized light upon transmission of the polarized light through the rotating film;
b) a first uniaxially birefringent film for transmitting light received from the rotating film, the first birefringent film having a thickness $d_1$ and a retardation value R:

$$R=(n_e-n_o)d_1/\cos\theta$$

$\theta$ being the angle of light incident upon the screen from the display, and $n_o$ and $n_e$ being the refractive indices, respectively, along the ordinary and extraordinary axes of the first birefringent film,
wherein $d_1$ is greater than 25 micrometers so that R is responsive to changes in $\theta$; and
c) a first polarizing film having a polarizing axis positioned to receive the light transmitted from the first birefringent film.

2. The privacy screen of claim 1 further comprising:
d) a second birefringent film for transmitting light received from the first polarizing film that is linearly polarized to the polarizing axis of the first polarizing film, the second birefringent film having a thickness $d_2$ of greater than or equal to 25 micrometers; and
e) a second polarizing film positioned to receive the light transmitted from the second birefringent film, the second polarizing film having a polarizing axis.

3. The privacy screen of claim 1 or 2 wherein the birefringent film exhibits birefringence in the visible and infrared regions of the electromagnetic spectrum.

4. The privacy screen of claims 1 or 2 wherein the birefringent film has $n_e-n_o$ values ranging from about 0.00002 to about 0.001.

5. The privacy screen of claims 1 or 2 wherein the birefringent film has a thickness ranging from about 25 microns to about 1000 microns.

6. The privacy screen of claim 2 wherein the polarizing axis of the first polarizing film is oriented at a first angle of 90° plus or minus 60° to the display polarizing axis and the polarizing axis of the second polarizing film is oriented at a second angle of 90° plus or minus 60° to the display polarizing axis.

7. The privacy screen of claim 6 wherein the polarizing axis of the first polarizing film is oriented at a first angle of 90° plus or minus 15° to the display polarizing axis, the polarizing axis of the second polarizing film is oriented at a second angle of 90° plus or minus 15° to the display polarizing axis, the optical axis of the first uniaxially birefringent film approximately bisects the first angle, and the optical axis of the second birefringent film approximately bisects the second angle.

8. The privacy screen of claim 1 wherein the polarizing axis of the first polarizing film is at an angle of 67.5° to the optical axis of the rotating film.

9. The privacy screen of claim 2 wherein the polarizing axis of the second polarizing film is at an angle of 67.5° to the optical axis of the rotating film.

10. The privacy screen of claim 1 wherein the following equation is satisfied:

$$(n_e-n_o)d_1=(2n-1)\lambda/2$$

where $\lambda$ is a wavelength of light incident upon the screen from the display, $(n_e-n_o)d_1$ is the retardation value R of the first birefringent film for light incident upon the screen normal to the display, and n is an integer.

11. The privacy screen of claim 10 wherein n=1 and the retardation value R of the first birefringent film ranges from 50 nm to 350 nm.

12. The privacy screen of claim 2 wherein the following equation is satisfied:

$$(n_e-n_o)d_2=(2n-1)\lambda/2$$

where λ is a wavelength of light incident upon the screen from the display, $(n_e-n_o)d_2$ relates to the second birefringent film having a retardation value $R_2$ and is the retardation value $R_2$ of the second birefringent film for light incident upon the screen normal to the display, and n is an integer.

13. The privacy screen of claim 12 wherein n=1 and the retardation value $R_2$ of the second birefringent film ranges from 10 nm to 250 nm.

14. The privacy screen of claim 1 wherein the following equation is satisfied:

$$(n_e-n_o)d_1=n\lambda$$

where λ is a wavelength of light incident upon the screen from the display, $(n_e-n_o)d_1$ is the retardation value R of the first birefringent film for light incident upon the screen normal to the display, and n is an integer.

15. The privacy screen of claim 14 wherein n=1 and the retardation value R of the first birefringent film ranges from 50 nm to 350 nm.

16. The privacy screen of claim 2 wherein the following equation is satisfied:

$$(n_e-n_o)d_2=n\lambda$$

where λ is a wavelength of light incident upon the screen from the display, $(n_e-n_o)d_2$ relates to the second birefringent film having a retardation value $R_2$ and is the retardation value $R_2$ of the second birefringent film for light incident upon the screen normal to the display, and n is an integer.

17. The privacy screen of claim 16 wherein n=1 and the retardation value $R_2$ of the second birefringent film ranges from 10 nm to 250 nm.

* * * * *